(12) United States Patent
Denholm, IV et al.

(10) Patent No.: US 8,119,009 B2
(45) Date of Patent: Feb. 21, 2012

(54) REHABILITATING CONTAMINATED WATER TREATMENT MEDIA WITH RESOURCE RECOVERY

(76) Inventors: Clifford F. Denholm, IV, Slippery Rock, PA (US); Robert C. Dolence, Moon Township, PA (US); Timothy P. Danehy, Saxonburg, PA (US); Margaret H. Dunn, Rochester, PA (US); Shaun L. Busler, Butler, PA (US); Thomas Grote, Sewickley, PA (US)

( * ) Notice: Subject to any disclaimer, the term of this patent is extended or adjusted under 35 U.S.C. 154(b) by 370 days.

(21) Appl. No.: 12/462,258

(22) Filed: Jul. 31, 2009

(65) Prior Publication Data

US 2010/0025334 A1 Feb. 4, 2010

Related U.S. Application Data

(60) Provisional application No. 61/137,556, filed on Aug. 1, 2008.

(51) Int. Cl.
*B01J 49/00* (2006.01)
(52) U.S. Cl. ........ 210/663; 210/672; 210/673; 210/675; 210/684; 210/688; 210/690
(58) Field of Classification Search .................. 210/672, 210/673, 675, 684, 688, 690, 663
See application file for complete search history.

(56) References Cited

U.S. PATENT DOCUMENTS 2,182,095 A * 12/1939 Pruyn Francis L ........... 210/270
2005/0173311 A1* 8/2005 Turnbull ....................... 209/419

OTHER PUBLICATIONS

"Flip Screen" device website, www.flipscreen.net/industry-materials-washing , downloaded Sep. 29, 2011.*

* cited by examiner

*Primary Examiner* — Chester Barry
(74) *Attorney, Agent, or Firm* — Gary P. Topolosky

(57) ABSTRACT

Dissolved metals are removed from contaminated water by passing the water through a bed containing media bodies, preferably limestone bodies. Various contaminants carried by the water become associated with the media bodies, thereby inhibiting water flow. The media bodies are rehabilitated by using an excavator, loader, or other machine to scoop them into a bucket having a peripheral wall including a sieve, immersing the container into a liquid held in a wash pit, rotating the bucket so that contaminants abraded from the bodies fall through the sieve into the pit, removing the container from the liquid, and dumping the rehabilitated media bodies from the bucket. When the media bodies have filtered mine drainage containing a particular dissolved metal such as manganese or iron for example, a residue remaining in the basin is a rich source of metal compounds that can be recovered for economic use.

20 Claims, 4 Drawing Sheets

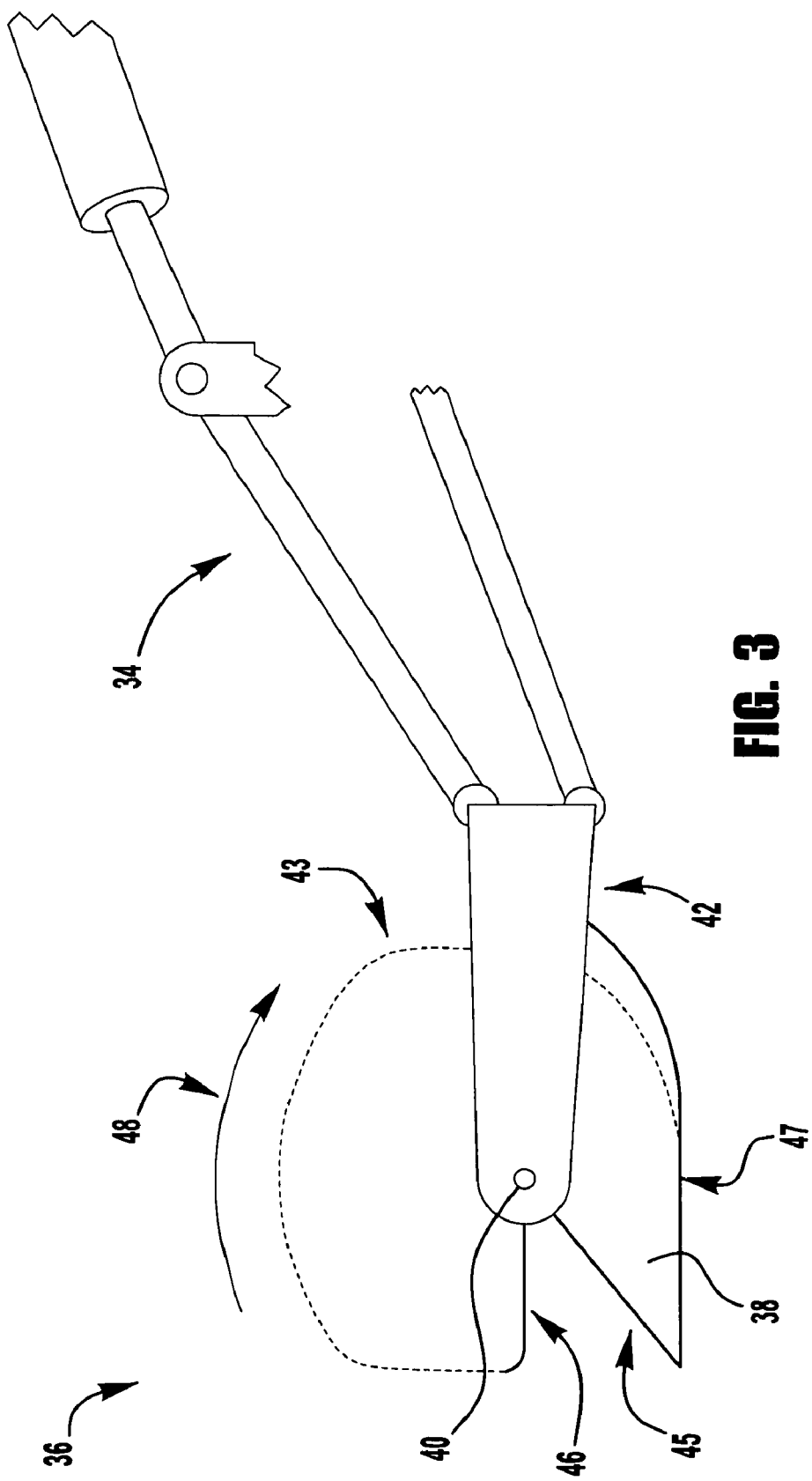

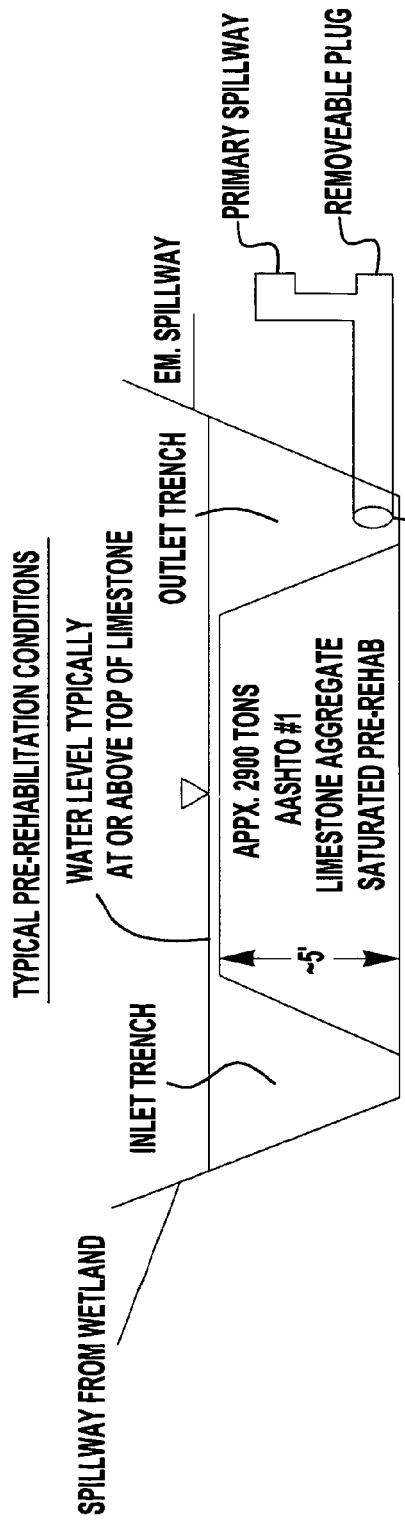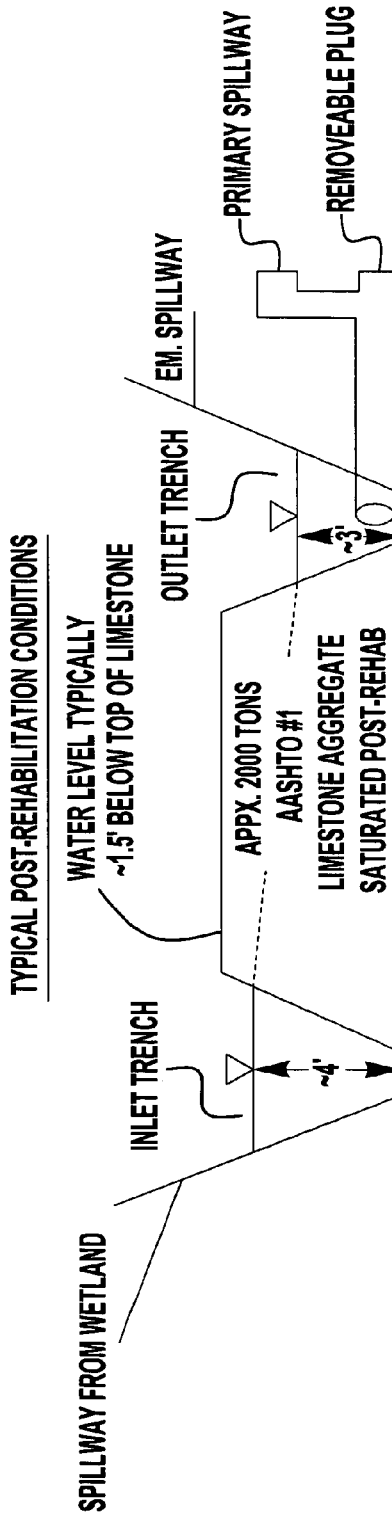

REHABILITATING CONTAMINATED WATER TREATMENT MEDIA WITH RESOURCE RECOVERY

CROSS-REFERENCE TO RELATED APPLICATION

This application claims priority to Provisional U.S. Application Ser. No. 61/137,556, filed on Aug. 1, 2008 and entitled "Rehabilitating Contaminated Water Treatment Media with Resource Recovery", the disclosure of which is fully incorporated by reference herein.

FIELD OF THE INVENTION

The present invention relates to the rehabilitation of water treatment media contaminated by metal compounds and organic matter and the simultaneous recovery of valuable resources.

BACKGROUND OF THE INVENTION

Mine drainage from abandoned sites is an international problem. In Pennsylvania, abandoned mine drainage is the largest non-point source of stream impairment. Over 4,600 miles (7,400 km) of Pennsylvania streams have been degraded by mine drainage. In many cases entire watersheds have been so severely impacted by mine drainage that essentially no or little aquatic life remains.

Passive systems are one available technology for treating polluted mine drainage. These systems typically use no electricity, require limited maintenance, and utilize environmentally-friendly materials such as limestone aggregate and spent mushroom compost to encourage a variety of natural processes to occur in a series of constructed ponds, beds, ditches, and wetlands. The goal is to provide economical, long-term, effective treatment while minimizing daily operation and maintenance needs and therefore costs. Passive components are typically selected based upon the often variable quality and flow rate of the mine drainage to be treated, preferred chemical and/or biological processes, and available construction space. While typically used to provide treatment of mine water, passive systems may also be used to treat other sources of polluted waters.

Many passive components consist of constructed beds or ponds filled with limestone to neutralize acidity, raise pH, and/or remove metals. One of the many effective components available to designers of passive treatment systems is the Horizontal Flow Limestone Bed (HFLB). An HFLB is an open, unburied, bed of limestone aggregate, which is commonly installed as the final component in a passive treatment system. The HFLB serves two major purposes. First, the HFLB provides an alkalinity boost to the final effluent, which adds buffering capacity to the stream which in many cases is needed to lessen the impact of other acidic sources downstream. Second, the HFLB effectively removes dissolved manganese from the water stream.

Historically, removal of dissolved manganese from mine drainage has been problematic and thought to require chemical treatment in order to raise the pH above 9. With the development of passive technology, dissolved manganese has been observed to form solids at a much lower pH (6 to 7). The exact mechanism is not completely understood, but biogeochemical factors such as low dissolved ferrous iron concentrations, high dissolved oxygen concentrations, available surface area, sufficient alkalinity, presence of certain microorganisms (bacterial and fungal), and autocatalytic processes appear to play a significant role. The availability of certain nutrients, dissolved organic carbon, and other factors may also be important, depending upon the role and types of microorganisms in the removal process.

The HFLB, as well as many other effective passive treatment technologies such as vertical flow ponds, accumulate metal precipitates, sediment, vegetative debris, and various other contaminants. Over time, the accumulation of these materials results in decreased treatment efficiency as the treatment media becomes plugged and permeability decreases.

Before our invention, prior art methods for restoring permeability to the treatment media of these passive systems included flushing, backflushing, stirring, and other techniques. While these methods can be effective for some passive components, for others the impact to the overall functionality has been minimal or short lived. In some cases, the treatment media had become so coated with metals or the void spaces had become so plugged that the treatment media was actually removed, discarded, and subsequently replaced even though the media itself still possessed significant treatment capabilities. Decreased functional life expectancy of the component increases long term operation and maintenance costs and can lead to a perception that passive treatment is too costly, ineffective, and/or unreliable.

Accordingly, the present invention satisfies a need for a method of media rehabilitation that not only restores efficacy and functionality of the water treatment component, but also facilitates reuse of viable treatment media and recovers metal-containing material accumulated in the media as a valuable resource. Media rehabilitation saves money by extending the life of the treatment media. In addition, sale of the recovered metals and/or products made from the recovered metals may offset the cost of rehabilitation or possibly even generate profit. Another desirable aspect of our invention is that the recovery system is readily portable (even to remote locations) with a quick set-up time. Additional objectives and advantages of the invention will become apparent from the following detailed description of some particularly preferred embodiments.

SUMMARY OF THE INVENTION

Water contaminated with dissolved metals and other contaminants is directed through a bed, pond, or channel of media bodies (i.e. treatment media) to remove the metals from the water. The metal precipitates, sediment, vegetative debris, and other contaminants are retained by the media bodies, thereby coating the media, plugging the bed, inhibiting water flow, and reducing treatment effectiveness.

The media bodies are rehabilitated by utilizing an excavator, loader, or other machine to scoop the contaminated media bodies from the bed into a bucket mounted on an axis for rotation, the container including a peripheral wall spaced radially outwardly of the axis. At least a portion of the peripheral wall is a sieve. The bucket is loaded with contaminated media bodies through an opening. The loaded bucket is then immersed in a liquid held in a wash pit or basin. The bucket is rotated about its axis in a predetermined first direction, thereby washing the media bodies as well as agitating the media bodies against each other and against the bucket wall. Agitating the bodies in the bucket separates the bodies from the contaminants which pass through the sieve into the pit, thereby rehabilitating the bodies. Rehabilitated media bodies are dumped out of the bucket by rotation in a second direction opposite the first direction. The rehabilitated media bodies are suitable for reuse in treating mine drainage.

In a preferred embodiment the container peripheral wall defines an opening and an internal baffle extends from the peripheral wall radially inwardly in the region of the opening. The baffle prevents media bodies from falling through the opening as the container rotates in the first direction. The bucket supports a scoop adjacent to the opening for loading media bodies inside the bucket.

The contaminated water is usually mine drainage. However, the treatment process is applicable to other metal contaminated waters. Metal ions and compounds in the contaminated water may include but are not limited to manganese, iron, aluminum, nickel, zinc, cadmium, etc. When the contaminated water is mine drainage, contaminants recovered from the media bodies most likely include manganese, iron, or aluminum compounds which may be suitable for use in numerous industrial processes and products including bricks, cement products, and ceramic glazes. The media bodies preferably include limestone, dolomite, marble, basic steel slag, blast furnace slag, or other forms of slag. Beds of limestone bodies are particularly preferred.

spent mushroom compost. The effluent of the 2 VFPs 18, 19 is then conveyed by adjustable risers 20 to a settling pond 22 before entering a 1½-acre (0.6 hectare) aerobic wetland 24. From the wetland 24, the effluent is conveyed to a horizontal flow limestone bed (HFLB) 26 containing about 2900 tons (2631 metric tons) of limestone having the same size and quality as in the VFPs. Effluent from the HFLB 26 is returned to the tributary 12, downstream from the check dam 13.

A preferred VFP and preferred riser 20 are shown and described in Hilton, Jr. U.S. Pat. No. 6,893,570, issued May 17, 2005 and Danehy et al. U.S. Pat. No. 7,232,278, issued Jun. 19, 2007. Disclosures of the Hilton, Jr. and Danehy patents are incorporated herein by reference.

A passive system 10 has been successfully treating acidic, metal-laden, mine drainage with widely varying flow rates since the year 2000 in Butler County, Pa. Table 1 depicts the general effectiveness of the system, which has a maximum design flow rate of 200 gpm (757 lpm). Actual measured flow rates have ranged from 10 to 445 gpm (38 to 1685 lpm).

TABLE 1

| | | | | | Passive System Influent and Effluent Values (range) | | | | | | |
|---|---|---|---|---|---|---|---|---|---|---|---|
| Point | Flow (gpm) | F. pH (s.u.) | F. Alk (mg/L) | L. Alk (mg/L) | Acidity (mg/L) | T. Fe (mg/L) | D. Fe (mg/L) | T. Mn (mg/L) | D. Mn (mg/L) | T. Al (mg/L) | D. Al (mg/L) |
| Raw | | 2.9-4.5 | 0 | 0 | 92-451 | 7-82 | 8-37 | 18-84 | 11-77 | 2-15 | 5-13 |
| Effluent | 10-445 | 5.8-7.7 | 22-219 | 6-250 | −73-35 | 0-15 | 0-6 | 0-51 | 3-46 | 0-3 | 0-1 |

The number of sampling events and sampling dates vary for each point and for individual parameters.
F. refers to field measurements and
L. refers to lab measurements.
T. refers to total metal content and
D. refers to dissolved metal content.

BRIEF DESCRIPTION OF THE DRAWINGS

Further features, objectives and advantages of the present invention will become clearer when referring to the following detailed description of preferred embodiments made with reference to the accompanying drawings in which:

FIG. 3 is a side elevational view of an attachment on the excavator of FIG. 2;

FIG. 4 is a schematic view of a horizontal flow limestone bed (HFLB) before rehabilitation of contaminated media bodies; and FIG. 5 is a schematic view of the HFLB of FIG. 4, after its media bodies are rehabilitated in accordance with the present invention.

DETAILED DESCRIPTION OF A PREFERRED EMBODIMENT

Figure 1:
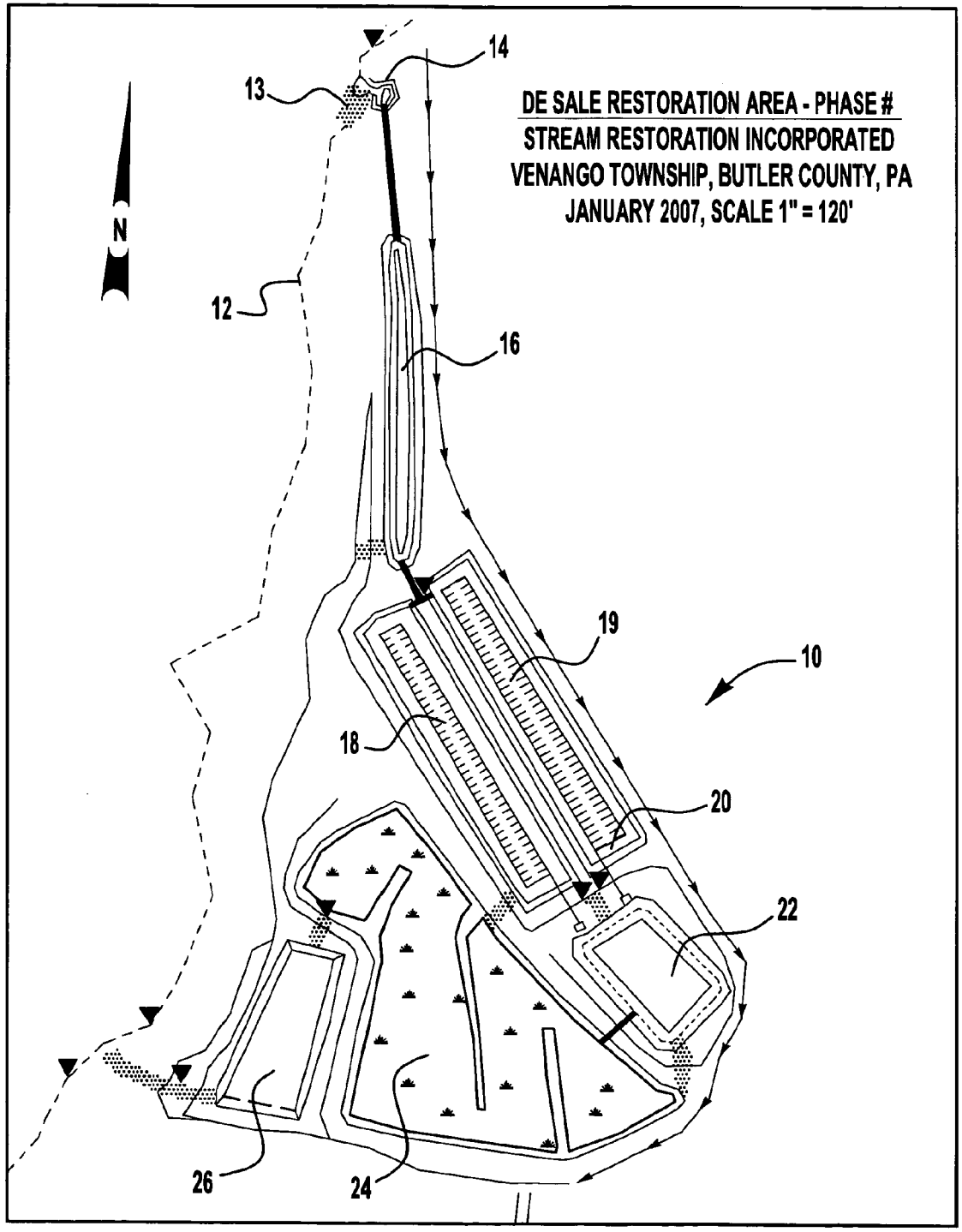
FIG. 1 is a top plan view of a water treatment system for a stream contaminated by mine drainage.

One example of a passive system 10 for treating a tributary or stream 12 contaminated by mine drainage is shown schematically in FIG. 1. Upstream of a check dam 13, an intake opening or intake 14 captures the flow except during excessive storm events. The flow passes from the intake 14 through a long narrow forebay 16 having its effluent split between 2 vertical flow ponds (VFPs) 18, 19 each containing about 2200 tons (1996 metric tons) of limestone (90% $CaCO_3$) aggregate (AASHTO #1: 4"×¾") overlain by about ½ foot (15 cm) of Based upon available data, we estimate that over a 7½ year period approximately 60,000 to 80,000 lbs (22,000 to 30,000 kg) of manganese were retained within the passive treatment system that otherwise would have entered Seaton Creek in Butler County, Pa.

After the first 3 years of operation, accumulation of manganese compounds as well as compounds of other metals, sediment, and vegetation resulted in the HFLB 26 having small pockets of standing water. During high flow periods, a portion of the influent water flowed across the top of the HFLB and over an emergency spillway instead of flowing through the limestone, which reduced treatment effectiveness. Initial attempts at restoring the HFLB 26 to its original condition had limited effectiveness and were temporary. Such unsuccessful attempts included backflushing the bed with compressed air, stirring the bed, and drying the bed to break up some of the accumulated material.

Figure 2:
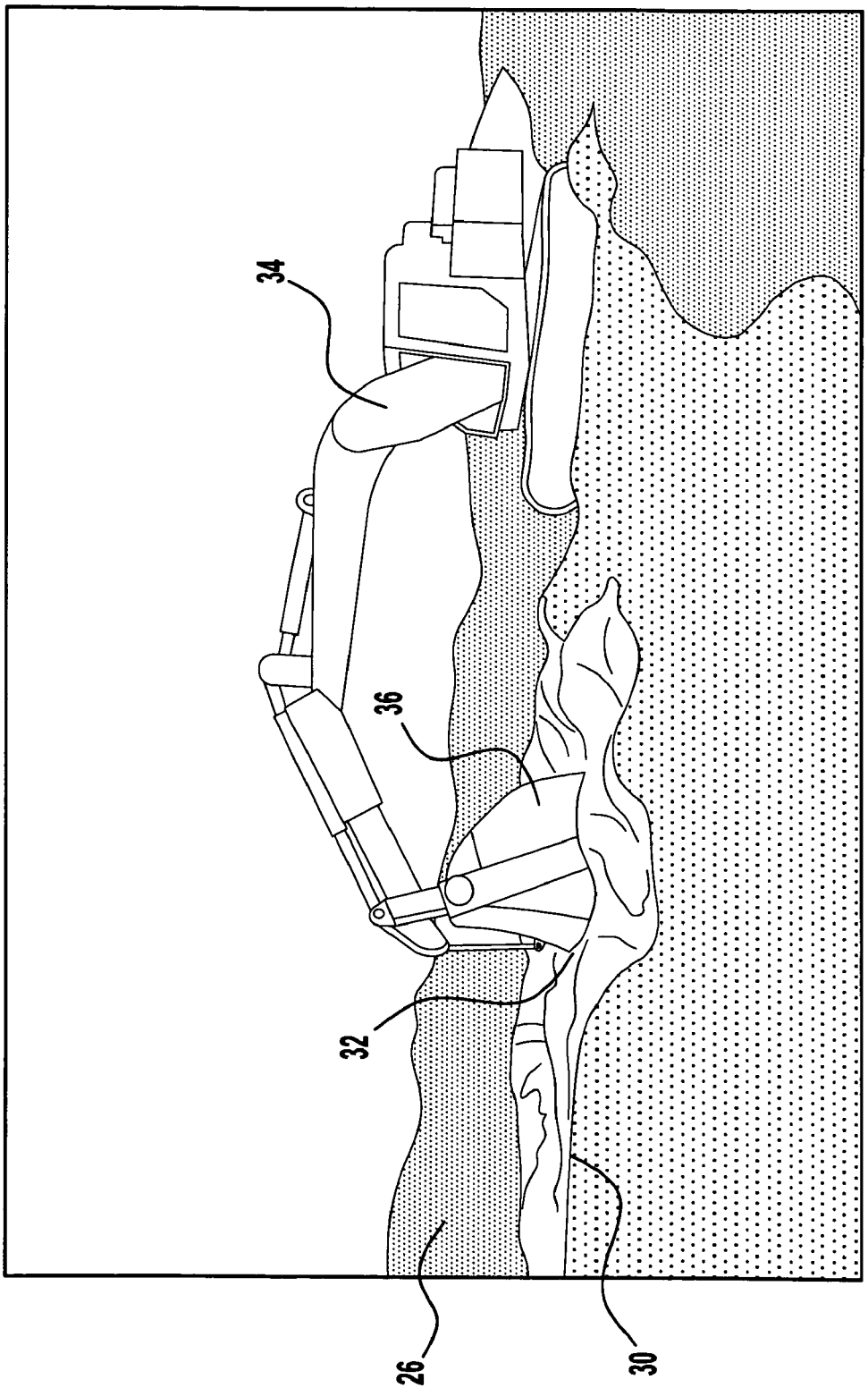
FIG. 2 is a perspective view of an excavator having an attachment for washing media bodies in accordance with the present invention.

Referring now to FIG. 2, in accordance with our invention, influent flow to an HFLB 26 was bypassed and the HFLB was drained during a seasonal low-flow period. The drainage was adequately treated by manipulating flow through the other passive treatment components. A wash pit 30 was excavated, lined, and filled with water 32 pumped from the wetland. An excavator 34 with a rotating screen attachment 36 was positioned adjacent the wash pit or basin 30. A particularly preferred rotating screen attachment 36 is sold under the trademark FLIP SCREEN by Flip Screen Australia Pty. Ltd., of Wagga Wagga NSW, Australia. The FLIP SCREEN attachment for practicing the present invention is described in greater detail in U.S. Patent Publication No. 2005/0173311 dated Aug. 11, 2005, the disclosure of which is incorporated herein by reference.

As shown in FIG. 3, a preferred attachment 36 includes a bucket 38 rotating around a generally horizontal axis 40 supported by an arm 42. The bucket 38 includes a peripheral wall 43 at least a portion of which is a screen or sieve. The bucket 38 also defines an opening 45, a baffle 46 above the opening, and a collecting tray or scoop 47 for scooping media bodies into the bucket 38 through the opening 45. A motor (not shown) initially rotates the bucket 38 around the axis 40 in a first direction indicated by an arrow 48. The motor later rotates the bucket 38 in a second direction opposite to the first direction to remove the treated media bodies.

The sieve 43 in the rotating bucket 38 suitably comprises a ⅜ inch (0.95 cm) screen. Other screen size openings are suitable depending upon the size and composition of the media bodies. After media bodies are cleaned and refurbished they are dumped out of the rotating bucket and preferably returned directly to the HFLB 26.

The residue in the wash pit 30 is pumped, excavated, or otherwise placed into containers for dewatering and storage. Examples of suitable containers for storage and dewatering include but are not limited to flexible intermediate bulk containers (FIBCs), filter bags, and geotextile dewatering tubes. In other cases water in the wash pit was allowed to dewater and dry within the pit prior to removal. Once a sufficient quantity of the recovered residue is retained within the storage and dewatering containers, the recovered material can be removed off site for further processing and/or commercial use.

After the HFLB 26 was rehabilitated in accordance with the invention, effectiveness of the rehabilitated bed was tested at 3, 24, 64, and 118 days after the bed 26 was placed back online. Table 2 shows post-rehabilitation results for some selected parameters.

As shown schematically in FIG. 4, before rehabilitation the water level in the HFLB was at or near the limestone bed top surface across the entire length of the bed. The manganese removal rate was calculated as 0.008 pounds/day/ton of stone. As shown schematically in FIG. 5, the rehabilitation effort significantly increased the hydraulic gradient which resulted in less limestone being used. Based upon the gradient and other factors, a rough calculation indicates that only about ⅔ of the treatment media is currently being used. The manganese removal rate is currently 0.012 pounds/day/ton of stone. Review of pre- and post-rehabilitation conditions indicates that efficacy of the HFLB has improved.

Samples of the recovered material were collected from several FIBCs for laboratory testing. X-ray diffraction (XRD) on the samples revealed that the manganese portion of the recovered material is mostly a mixture of todorokite, birnessite, and/or amorphous manganese oxides. Other oxides of manganese identified within the XRD analyses have included buserite and johannsenite. It is unknown if the crystal structures will change over time as the material dries and "ages".

Preliminary X-Ray Fluorescence (XRF) results of several samples reported major oxides of about 25% MnO, 20% $SiO_2$, 10% $Al_2O_3$, 10% CaO, and 25% loss on ignition. Average XRF results are reported in Table 3. Elemental Analysis was also conducted by a variety of laboratory methods and average results reported in Tables 4 and 5. As can be seen, numerous elements have been identified which were measurable above the detection limit. It is unknown at this time if any of these elements are in significant concentrations to be extracted economically. Metals of particular interest include

TABLE 2

Post-Rehabilitation Influent and Effluent Water Quality

| Parameter | 3 days | | 24 days | | 64 days | | 118 days | |
|---|---|---|---|---|---|---|---|---|
| | In | Out | In | Out | In | Out | In | Out |
| Flow | 10 | 10 | 40 | 40 | 83 | 83 | 250 | 250 |
| pH (field) | 5.08 | 6.49 | 6.42 | 6.93 | 6.86 | 6.76 | 5.58 | 6.53 |
| ORP | 316 | 279 | 169 | 158 | 153 | 141 | 245 | 176 |
| DO | 7.27 | 5.08 | 7.57 | 1.33 | 9.35 | 2.28 | 10.63 | 8.43 |
| Temp. | 22.5 | 18.7 | 20.0 | 18.1 | 10.8 | 8.8 | 3.9 | 2.9 |
| Alkalinity (field) | 16 | 58 | 18 | 87 | 36 | 71 | 7 | 25 |
| Alkalinity (lab) | 2.47 | 42.25 | 12.90 | 82.74 | 30.78 | 66.57 | 3.24 | 26.45 |
| Hot Acidity | 117.11 | 4.66 | 81.59 | −73.04 | 54.90 | −52.15 | 39.20 | −12.81 |
| T. Fe | 0.25 | 0.19 | 0.16 | 0.05 | 0.56 | 0.07 | 0.44 | 0.10 |
| D. Fe | 0.23 | 0.13 | 0.10 | 0.02 | 0.48 | 0.06 | 0.34 | 0.02 |
| T. Mn | 64.83 | 30.78 | 55.12 | 9.84 | 47.44 | 8.77 | 20.41 | 8.59 |
| D. Mn | 63.83 | 30.14 | 54.89 | 9.78 | 46.38 | 8.67 | 19.82 | 7.77 |
| T. Al | 3.43 | 0.24 | 0.48 | 0.26 | 0.38 | 0.23 | 2.19 | 0.25 |
| D. Al | 3.25 | 0.09 | 0.13 | 0.08 | 0.30 | 0.15 | 0.93 | 0.18 |
| SO4 | 1279.8 | 1297.1 | 1308.3 | 1322.0 | 1131.7 | 1123.9 | 538.6 | 519.5 |

Flow in gallons per minute;
pH in standard units;
ORP in mV;
Dissolved Oxygen in mg/L;
Alkalinity and Acidity in mg/L as $CaCO_3$;
Total (T) and Dissolved (D) Metals in mg/L;
Sulfates in mg/L.

The influent to the HFLB is a net-acidic manganese-bearing drainage. On days 24, 64, and 118 the effluent had dissolved Mn concentrations of less than 10 mg/L. On average, the rehabilitated bed reduced manganese concentration by about 32 mg/L (70%) compared with an average of 12 mg/L (35%) removed prior to rehabilitation.

Silver (Ag), Barium (Ba), Chromium (Cr), Cobalt (Co), Copper (Cu), Nickel (Ni), Strontium (Sr), Yttrium (Y), and Zinc (Zn).

The manganese material residue is dried to yield a recovered product that is currently being used in ceramic glazes.

Other potential uses for the recovered product include colorants in bricks and cement as well as a variety of other industries.

TABLE 3

Major Oxides (as %) of Recovered Manganese Material Determined by X-Ray Fluorescence

| SiO2 | Al2O3 | Fe2O3 | MnO | MgO | CaO | Na2O | K2O | TiO2 | P2O5 | SO3 | CoO | NiO | ZnO | BaO | LOI | Total |
|---|---|---|---|---|---|---|---|---|---|---|---|---|---|---|---|---|
| 21.0 | 9.5 | 4.7 | 27.1 | 0.9 | 11.0 | 0.2 | 1.0 | 0.3 | 0.2 | 0.8 | 0.2 | 0.2 | 0.2 | 0.1 | 23.2 | 100.6 |

TABLE 4

Elemental Analysis of Recovered Manganese Material (Average Values in parts per million)

| Ag ppm | Ba ppm | Be ppm | Bi ppm | Br ppm | Cd ppm | Co ppm | Cr ppm | Cs ppm | Cu ppm | Hf ppm | Mo ppm | Ni ppm | Pb ppm | Rb ppm | Sb ppm | Sc ppm |
|---|---|---|---|---|---|---|---|---|---|---|---|---|---|---|---|---|
| 1.0 | 516.2 | 7.4 | 6.0 | 3.6 | 2.6 | 1794 | 27.0 | 3.0 | 25.8 | 2.6 | 8.7 | 1397.0 | 22.2 | 60.0 | 0.7 | 4.2 |

TABLE 5

Elemental Analysis of Recovered Manganese Material (Average Values)

| Sr ppm | Ta ppm | Th ppm | U ppm | V ppm | Y ppm | Zn ppm | Zr ppm | La ppm | Ce ppm | Nd ppm | Sm ppm | Eu ppm | Tb ppm | Yb ppm | Lu ppm |
|---|---|---|---|---|---|---|---|---|---|---|---|---|---|---|---|
| 232.9 | 1.4 | 5.5 | 6.4 | 36 | 201.0 | 1602.4 | 86.25 | 59.5 | 115 | 71 | 15 | 5.3 | 3.5 | 6.8 | 0.94 |

The foregoing description of our invention refers to a particularly preferred process. Persons skilled in the art understand that numerous modifications and variations can be made therein without departing from the spirit and scope of the following claims.

What is claimed is:

1. In a method for removing one or more dissolved metals from water wherein metal-containing water is flowed through a bed, pond or channel containing a plurality of media bodies interspersed with spaces to remove the dissolved metals from the water, said media bodies becoming associated with contaminants derived from the metal-containing water, said contaminants occupying said spaces and plugging said bed, pond or channel to inhibit water flow, the improvement comprising:
   (a) scooping contaminated media bodies from the bed into a bucket mounted on an axis for rotation, said bucket including a peripheral wall spaced radially outwardly from said axis, at least a portion of said peripheral wall comprising a sieve,
   (b) immersing the bucket loaded with contaminated media bodies into a liquid held in a wash basin,
   (c) rotating the bucket about its axis, thereby washing said media bodies and abrading them against each other and against the peripheral wall to separate the contaminants from the media bodies for producing rehabilitated media bodies, said separated contaminants passing through said sieve and into said wash basin, and
   (d) dumping rehabilitated media bodies from the bucket, said rehabilitated media bodies being suitable for reuse in removing additional dissolved metals from the water.

2. The improvement of claim 1, wherein said contaminants are selected from the group consisting of metal compounds, sediment, organic matter, algae, bacteria and combinations thereof.

3. The improvement of claim 2, wherein said contaminants include at least one compound with a metal component selected from the group consisting of: manganese, iron, aluminum, silver, chromium, copper, nickel, zinc, yttrium, barium, cobalt, strontium and combinations thereof.

4. The improvement of claim 1, wherein said media bodies are selected from the group consisting of: limestone, dolomite, marble, sandstone, basic steel slag, blast furnace slag, other slag forms, and combinations thereof.

5. The improvement of claim 4, wherein said media bodies are adapted for retaining oxides of manganese, iron, aluminum, and combinations thereof from the metal-containing water.

6. The improvement of claim 1 which further comprises:
   (e) removing the separated contaminants from said vessel and recovering metal values from the separated contaminants.

7. The improvement of claim 1, wherein step (c) comprises:
   rotating the bucket in a first direction; and step (d) comprises:
   rotating the bucket in a predetermined second direction opposite the first direction.

8. The improvement of claim 1, wherein the bucket includes an opening for receiving the media bodies and a baffle attached to the peripheral wall adjacent said opening, said baffle adapted for preventing media bodies from escaping through said opening during step (c).

9. The improvement of claim 1, wherein said metal-containing water comprises mine drainage.

10. The improvement of claim 1, wherein said bucket is situated at the end of an industrial excavator.

11. A method for recovering metal values from mine drainage that contains dissolved metals and organic matter, said method comprising:
   (a) filtering said mine drainage through a bed of media bodies in order for said media bodies to associate with metal compounds and organic matter carried by the mine drainage until said bed of media bodies sufficiently contaminates and plugs up to inhibit water flow therethrough;

(b) scooping contaminated media bodies from the bed in a bucket mounted on a rotatable axis, said bucket including a peripheral wall spaced radially outwardly from said axis, at least a portion of said peripheral wall comprising a sieve, (c) immersing the bucket loaded with contaminated media bodies in water held in a wash basin, (d) rotating the bucket about its axis for agitating said contaminated media bodies to: (i) separate the metal compounds and organic matter therefrom; and (ii) produce rehabilitated media bodies, said metal compounds and organic matter passing through said sieve into said wash basin, and (e) dumping rehabilitated media bodies from the bucket, said rehabilitated media bodies being suitable for reuse in filtering additional mine drainage.

12. The method of claim 11 which further comprises:
(f) recovering metal compounds from the wash basin.

13. The method of claim 12, wherein said metal compounds include at least one oxide of manganese.

14. The method of claim 13, wherein said manganese oxide is selected from the group consisting of: todorokite, bimessite, buserite, one or more amorphous manganese oxides and combinations thereof.

15. The method of claim 12, wherein said recovered metal compounds include at least one compound with a metal component selected from the group consisting of: manganese, iron, aluminum, silver, chromium, copper, nickel, zinc, yttrium, barium, cobalt, strontium and combinations thereof.

16. The method of claim 11, wherein said bucket is situated at the end of an industrial excavator.

17. A method for recovering metal values from mine drainage that contains dissolved metals and other contaminants, said method comprising:
passing said mine drainage through a bed of media bodies rehabilitated by the method of claim 11, thereby associating said media bodies with metal compounds and other contaminants; and separating metal compounds from the media bodies and other contaminants.

18. The method of claim 17, wherein said media bodies are selected from the group consisting of: limestone, dolomite, marble, basic steel slag, blast furnace slag, other slag forms, and combinations thereof.

19. The method of claim 18, wherein said media bodies consist essentially of limestone.

20. The method of claim 18, wherein said media bodies consist essentially of dolomite.

* * * * *